United States Patent Office 3,551,506
Patented Dec. 29, 1970

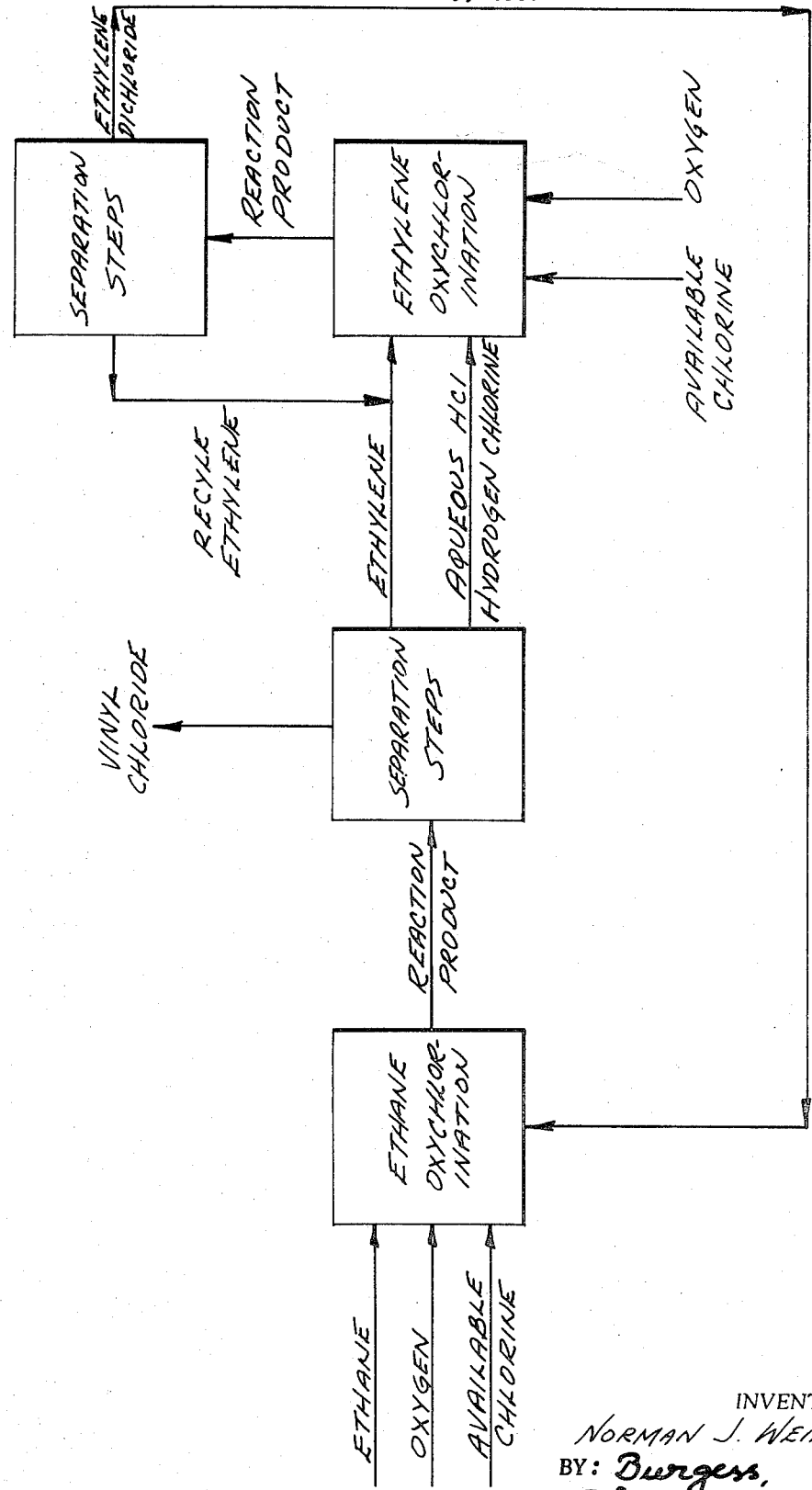

3,551,506
VINYL CHLORIDE PRODUCTION
Norman J. Weinstein, Somerville, N.J., assignor to Princeton Chemical Research, Inc., Princeton, N.J., a corporation of New Jersey
Filed Dec. 5, 1967, Ser. No. 688,103
Int. Cl. C07c 21/06
U.S. Cl. 260—656                                    12 Claims

ABSTRACT OF THE DISCLOSURE

This specification discloses a process for converting ethane to vinyl chloride by vapor phase oxychlorination of ethane to a vapor product containing vinyl chloride, ethylene, water and hydrogen chloride; oxychlorinating the ethylene in the liquid phase to 1,2-dichloroethane, referred to as ethylene dichloride, using at least in part, aqueous hydrogen chloride recovered from the vapor product of the ethane oxychlorination, and recycling the ethylene dichloride to the ethane oxychlorination.

DISCLOSURE OF THE INVENTION

This invention relates to the production of vinyl chloride by a two-stage oxychlorination process using a $C_2$ feed and more especially to a process in which there is only a negligible loss of available chloride.

Oxychlorination of ethane to product vinyl chloride can generally be described as the reaction between available chlorine, ethane, and oxygen at an elevated temperature in the presence of a multivalent metal compound catalyst.

As used in the specification and the appended claims, available chlorine is the chlorine in the elemental chlorine charged, in the hydrogen chloride charged, and one-half the chlorine present in 1,1-dichloroethane and 1,2-dichloroethane charged to the reaction zone, when these are present in the feed. If ethyl chloride is present in the feed, none of the chlorine present in ethyl chloride is considered available.

Many catalysts have been proposed for this process, including compounds of iron, copper, cerium, manganese, uranium, vanadium, nickel, chromium, cobalt, as well as of other Group IV$b$, V$b$, VI$b$, VII$b$, VIII, IV$a$, V$a$, and VI$a$ metals or combinations thereof. Certain inorganic compounds of lithium, sodium, potassium, rubidium, cesium, magnesium, calcium, strontium, barium, zinc, cadmium, boron, indium, phosphorus and thallium act as promoters in combination with the catalytic ingredients listed above. The catalysts can be used in fixed fluid or suspended bed form and can include a support such as diatomaceous earth, quartz, Vycor, (96% silica glass) alumina, pumice, silica gel, mullite, kieselguhr, etc.

Such oxychlorination of ethane produces vinyl chloride, ethylene, water and hydrogen chloride, admixed with side products or other materials, such as unreacted feed materials.

Because substantial amounts of hydrogen chloride are present in the reaction product resulting from the oxychlorination of ethane with available chlorine, recovery of this hydrogen chloride is important if the process is to be economically attractive. While it has been proposed to separate hydrogen chloride from the reaction product and to recycle the hydrogen chloride to the ethane oxychlorination, total hydrogen chloride recovery is difficult since hydrogen chloride forms an azeotrope with water present in the reaction product. Therefore, to produce a nearly anhydrous hydrogen chloride recycle stream is expensive.

When it is desired to maximize vinyl chloride output from an ethane oxychlorination, the ethylene produced by the oxychlorination can be converted to vinyl chloride. It has been proposed to do this by oxychlorinating the ethylene in the vapor phase to ethylene dichloride and dehydrochlorinating the ethylene dichloride to vinyl chloride. To prevent coke and tar formation during dehydrochlorination, the ethylene dichloride must be of high purity and dryness which increases the cost of the overall process.

Accordingly, it is an object of the invention to provide an economical process for the production of vinyl chloride from ethane.

Another object of this invention is to provide a process for the production of vinyl chloride from ethane in which hydrogen chloride produced by ethane oxychlorination is used as available chlorine without the necessity of first breaking the water-hydrogen chloride azeotrope.

Still another object of this invention is to provide a process in which ethylene produced by ethane oxychlorination is upgraded to vinyl chloride in an efficient and economical manner.

In accomplishing these and other objects, one feature of this invention resides in oxychlorinating ethane in the vapor phase with oxygen and available chlorine at elevated temperatures in the presence of at least one compound of a multivalent metal to produce a vapor product stream containing vinyl chloride, ethylene, hydrogen chloride and water; resolving the vapor product to recover at least the vinyl chloride; oxychlorinating the ethylene in a liquid phase aqueous reaction medium in the presence of a dissolved multivalent chloride catalyst, oxygen and the hydrogen chloride produced by the ethane oxychlorination; recovering a liquid phase product comprising ethylene dichloride; and recycling the ethylene dichloride to the vapor phase ethane oxychlorination.

Other objects, features, and advantages of this invention will be apparent to those skilled in the art from a consideration of the following detailed description and the drawing, wherein:

The single figure is a flow diagram of the process of this invention.

As illustrated in the drawing, ethane is reacted with oxygen and available chlorine in the vapor phase in the presence of a multivalent metal compound catalyst at a temperature of about 400 to 700° C. The vapor product of ethane oxychlorination is separated to recover vinyl chloride and an aqueous hydrogen chloride stream. Ethylene in the vapor product, along with the aqueous hydrogen chloride stream, is subjected to liquid phase oxychlorination utilizing the hydrogen chloride in the aqueous hydrogen chloride stream as at least part of the available chlorine required for liquid phase ethylene oxychlorination. The reaction product of the ethylene oxychlorination reaction contains unconverted ethylene, ethylene dichloride, and water and is resolved. Ethylene is recycled to the ethylene oxychlorination reaction, while ethylene dichloride is recycled to the vapor phase ethane oxychlorination reaction where it acts as a source of available chlorine and as a precursor of vinyl chloride. The conversion of ethylene dichloride to vinyl chloride is an endothermic reaction which aids in temperature control since the oxychlorination of ethane, which is carried on simultaneously, is highly exothermic.

Thus, the overall process converts ethane, oxygen and available chlorine to vinyl chloride with high selectivity in two reaction steps with little waste except for whatever carbon oxides and organic chlorides other than vinyl chloride and ethylene dichloride are produced in the process. As compared with the two processes operated individually, even where the ethylene byproduct of ethane oxychlorination is used as the raw material for oxychlorination, the process of this invention shows marked superiority and greater efficiency in: controlling net heat of reaction in the vapor phase oxychlorination reaction; eliminating a major separate process step (ethylene dichloride cracking); and either eliminating the need to employ expensive purification techniques to break the water hydrogen chloride azeotrope, or significantly reducing makeup available chlorine.

In practicing this invention, ethane is supplied as a gas along with available chlorine and oxygen to a vapor phase multivalent metal compound catalyzed first reaction zone. The available chlorine is partially the ethylene dichloride recycled from the liquid phase oxychlorination reaction discussed above and partly fresh feed. The fresh feed available chlorine can be elemental chlorine gas, hydrogen chloride, or chlorinated hydrocarbons. In one preferred embodiment of this invention, a portion of the available chlorine is part of the hydrogen chloride recovered from the vapor product of the ethane oxychlorination reaction. Available chlorine usually is supplied to the vapor phase reaction in an amount such as to provide about 1 to 5 gram atoms of available chlorine per mole of ethane fed.

Oxygen can be provided as air, air enriched with oxygen, oxygen, or oxygen diluted with an inert gas or gases. Total oxygen fed to the vapor phase ethane oxychlorination reaction is an amount which provides about 0.2 to 3 moles of oxygen per mole of ethane fed.

The ethane oxychlorination reaction is carried out at a temperature of about 400 to 700° C., usually at about 500 to 600° C. at a pressure of subatmospheric up to about 500 p.s.i.g., usually about 20 to 400 p.s.i.g. Catalysts for the reaction include those previously discussed.

The reaction product of the ethane oxychlorination reaction is in the vapor phase and contains vinyl chloride, ethylene, hydrogen chloride, water, nitrogen, unconverted ethylene dichloride, and often, other chlorinated hydrocarbons, such as ethyl chloride.

In practicing this invention, the vapor product of the ethane oxychlorination reaction is resolved to separate fractions of water and hydrogen chloride, ethylene, and vinyl chloride. Water and hydrogen chloride are removed from the vapor product by cooling and condensation, preferably by quenching with a cold aqueous hydrogen chloride stream, as disclosed in copending application Ser. No. 670,364, filed Sept. 25, 1967. Water and hydrogen chloride usually in an amount equivalent to that condensed from the vapor product are withdrawn from the quench system. The withdrawn aqueous hydrogen chloride stream can be used directly to supply available chlorine to the liquid phase ethylene oxychlorination reaction. However, in a preferred embodiment of this invention, the withdrawn aqueous hydrogen chloride stream is distilled to recover overhead of a nearly anhydrous hydrogen chloride stream therefrom and form bottoms of a second aqueous hydrogen chloride stream. To recover maximum hydrogen chloride in an efficient manner, the withdrawn aqueous hydrogen chloride is distilled to azeotropic concentration, although it can be distilled to a hydrogen chloride concentration above azeotropic. The nearly anhydrous hydrogen chloride overhead stream is recycled as available chlorine to the ethane oxychlorination reaction while the water-hydrogen chloride azeotrope or other bottoms of aqueous hydrogen chloride are used to supply available chlorine to the liquid phase oxychlorination reaction.

Hydrogen chloride remaining in the vapor product after the cooling and condensation step can be separated by absorption in water, dilute acid, or other agents, or can be separated during subsequent condensation steps and recycled to either the vapor phase or liquid phase reaction.

Vinyl chloride and any other organic chlorides present are separated from the vapor phase oxychlorination reaction product by conventional techniques, for example, by further cooling or partial condensation, or by absorption in a suitable solvent, such as ethylene dichloride. Vinyl chloride can be recovered and purified by distillation. Any other organic chlorides present, such as ethyl chloride, can be recovered by distillation and those having two carbon atoms can be recycled to the vapor phase reaction.

The vapor product of ethane oxychlorination, after removal of water, hydrogen chloride, vinyl chloride and other organic chlorides, contains ethylene which is preferably concentrated by conventional techniques before being fed to the second, liquid phase, oxychlorination reaction where the ethylene is converted to ethylene dichloride. Absorption of carbon dioxide, carbon monoxide, catalytic hydrogenation of acetylene, low temperature distillation, and adsorption are some of the techniques which can be used to concentrate the ethylene. When the liquid phase oxychlorination reaction is carried out at a higher pressure than the vapor phase reaction, compression of the ethylene-containing gas before, during, or after the separations is required before feeding ethylene to the liquid phase reaction. If ethane is recovered in significant quantities during ethylene concentration, it will normally be returned to the vapor phase oxychlorination reaction.

The ethylene oxychlorination stage of this invention is carried out under conditions known in the art. For details of liquid phase ethylene oxychlorination, reference is made to U.S. Pats. Nos. 3,214,481 and 3,214,482, the disclosures of which are incorporated herein by reference.

The liquid phase oxychlorination reaction can require additional available chlorine to supplement that carried over from the first, vapor phase reaction. When such fresh feed available chlorine is required, it is usually provided as hydrogen chloride, elemental chlorine or mixtures of them.

Make-up oxygen is required in this second reaction except in the case where sufficient excess oxygen is used in the first vapor phase reaction and the excess oxygen remains admixed with the ethylene and is fed to the liquid phase reaction. Make-up oxygen can be provided from one or more of the sources used for ethane oxychlorination. The oxygen requirement of the liquid phase oxychlorination reaction according to this invention usually is about 0.1 to 0.5 mole per mole of hydrogen chloride fed.

The liquid phase oxychlorination reaction is suitably conducted at about 100 to 200° C. at a pressure sufficient to maintain the liquid phase, generally about 20 to 400 p.s.i.g. The ethylene conversion is generally about 5 to 50 percent per pass for best results. Because of this low conversion of ethylene, it is desirable to provide fresh feed ethylene or to build up a large internal ethylene recycle when starting up the process.

The catalyst in the second reaction is a multivalent metal salt, suitably a multivalent metal chloride, for example, cupric chloride. It is preferred to provide the liquid phase catalyst as a redox system by utilizing a combination of chlorides of metals in different valence states. Thus, for example, ferric/ferrous, cupric/cuprous, or cupric/ferric chloride salt combinations have been found to be quite advantageous. The catalyst is suitably provided as about a 5 to 50 weight percent solution in the reaction medium.

As the reaction proceeds, available chlorine reacted with the ethylene to form ethylene dichloride tends to come from the metal chloride catalyst changing its valence state; for example, cupric chloride tends to convert to cuprous chloride. The conversion of ethylene to ethylene dichloride and the regeneration of the cuprous chloride to cupric chloride can be done simultaneously in the same reactor by feeding ethylene, available chlorine, oxygen, and water to a single reaction vessel. Alternatively, spent catalyst can be withdrawn and regenerated in a second vessel using all or part of the available chlorine and oxygen fed to the system. The regenerated catalyst is then returned to the first vessel. Separate vessels for ethylene dichloride production and catalyst regeneration is particularly advantageous when air is used in the liquid phase oxychlorination reaction as the oxygen source, thus avoiding dilution of ethylene dichloride and unconverted ethylene with nitrogen and unconverted oxygen. When catalyst regeneration is accomplished in a separate vessel, it is unnecessary to feed available chlorine and oxygen along with the ethylene to the ethylene dichloride producing reaction.

The product of ethylene oxychlorination is resolved to separate the gaseous components and the liquid components. Essentially, the separation is between the ethylene dichloride which is recycled to the vapor phase oxychlorination reaction and the ethylene which is recycled back to the liquid phase oxychlorination reaction. Water which is condensed from the reaction product with the ethylene dichloride forms a separate liquid phase. Part of this aqueous phase is recycled to the liquid phase oxychlorination, with an appropriate proportion discarded. In general, all of the organic chloride products go along with the ethylene dichloride and are recycled to the vapor phase reaction while all of the hydrocarbons, carbon oxides and inert gases such as nitrogen go along with the ethylene. The ethylene containing gas phase can be subected to purification, e.g., conventional low temperature ethylene purification, with the unwanted components being purged and the ethylene being thus concentrated and recycled. Alternatively, the ethylene containing gas stream can be recycled, except for a portion which is discarded to rid the system of inerts such as carbon oxides and nitrogen.

In one aspect of this invention, all or any part of the various chlorinated hydrocarbons produced in one or more portions of the described process can be resolved into substantially pure products or at least one or more substantially pure products can be recovered from the group. Thus it can be pactical to recover, as ar group, all of the chlorinated hydrocarbons of the vapor phase oxychlorination product and to separate each of methyl chloride and vinyl chloride therefrom while recycling the remaining chlorides, for example, ethyl chloride, ethylene dichloride and other polychloridinated materials, to the vapor phase reaction. Similarly, vinyl chloride can be recovered from the liquid phase oxychlorination product and the remaining chlorinated hydrocarbons recycled to the vapor phase oxychlorination reaction. In some instances, and depending particularly upon the product distribution, it can be desirable to combine the chlorinated hydrocarbon products of both the liquid and the vapor phase reactions into a single phase and to resolve this combined phase to recover the vinyl chloride values therefrom as the most important component, but other components can also be recovered. Lower hydrocarbon chlorides such as methyl chloride and methylene chloride can be recovered separately or included with the remainder of the chlorinated hydrocarbons for recycle to the vapor phase reaction.

EXAMPLES

The following examples are illustrative of the invention without in any way being limiting thereon. Flow rates are in pound moles per hour unless specified to the contrary.

In the following series of examples, the process is carried out by feeding ethane, chlorine (Example 1 only) hydrogen chloride, oxygen, and recycle ethylene dichloride to the vapor phase reaction (I) which is catalyzed by ion oxide supported on diatomaceous earth (Celite) in a fluidized bed. The vapor product of the ethane oxychlorination is quenched with a stream of aqueous hydrogen chloride at a temperature of 86° F. to condense and absorb water and hydrogen chloride therefrom. A portion of the resulting hydrogen chloride absorbate, containing the same amount of hydrogen chloride that was absorbed from the reaction product, is withdrawn and distilled to recover a nearly anhydrous hydrogen chloride stream therefrom and form an azeotrope of hydrogen chloride and water. The nearly anhydrous hydrogen chloride stream is recycled to the vapor phase ethane oxychlorination reaction (I) while the hydrogen chloride-water azeotrope is sent to the liquid phase ethylene oxychlorination reaction (II) as available chlorine.

Vinyl chloride is separated from the ethane oxychlorination reaction product by absorption in ethylene dichloride. The ethylene of the ethane oxychlorination reaction product stream is fed to the liquid phase reaction (II) after concentration of the ethylene content. Oxygen and make-up available chlorine are also fed to the liquid phase reaction (II), which is at a pressure of 300 p.s.i.g. In starting up the liquid phase reaction (II), fresh feed ethylene is added along with the ethylene from the ethane oxychlorination reaction. The liquid phase oxychlorination catalyst is an aqueous mixture of 7 molar $CuCl_2$ and 1 molar $CuCl$, with one liter of aqueous catalyst per gram mole of ethylene being used.

The ethylene oxychlorination reaction product is phase separated into a liquid aqueous phase, a liquid ethylene, dichloride phase and a vapor phase. A portion of the liquid aqueous phase is recycled to the ethylene oxychlorination reaction (II). The ethylene dichloride liquid phase is recycled to the vapor phase ethane oxychlorination reaction (I). The vapor phase product of the ethylene oxychlorination reaction (II), which contains unconverted ethylene, is recycled to the ethylene oxychlorination reaction (II) after a purge to rid the stream of inerts.

EXAMPLE 1

Pound moles per hour

|  | Vapor phase reaction (I) 500° C. | | | | Liquid phase reaction (II) 140° C. | |
|---|---|---|---|---|---|---|
|  | Feed | Product recovered | Product to II Gaseous | Product to II Aqueous | Feed | Product to I |
| Ethane | 100 |  |  |  |  |  |
| Vinyl chloride |  | 78 |  |  |  |  |
| Ethylene dichloride | 38 |  |  |  |  | 38 |
| Methyl chloride |  | 2 |  |  |  |  |
| Ethylene |  |  | 40 |  | a 340 |  |
| Chlorine | 14 |  |  |  | b 28 |  |
| Hydrogen chloride | c 250 |  |  | 22 | 22 |  |
| Water |  | 10 |  | 176 | (d) |  |
| Oxygen | 120 |  |  |  | 8 |  |
| Nitrogen | 0.5 |  |  |  | 5 |  | a Includes fresh feed ethylene added during startup of process. After startup, 300 pound moles per hour of ethylene are supplied by recycle.
b These reagents added as makeup.
c After startup, this is recycled from distillation of aqueous hydrogen chloride stream recovered from I.
d Water from I plus added water as needed to maintain heat balance.

EXAMPLE 2

Pound moles per hour

|  | Vapor phase reaction (I) 500° C. | | | | Liquid phase reaction (II) 140° C. | |
|---|---|---|---|---|---|---|
|  | Feed | Product recovered | Product to II | | Feed | Product to I |
|  |  |  | Gaseous | Aqueous |  |  |
| Ethane | 100 |  |  |  |  |  |
| Vinyl chloride |  | 75 |  |  |  |  |
| Ethylene dichloride |  | 24 |  |  |  | 24 |
| Methyl chloride |  | 1 |  |  |  |  |
| Ethylene |  |  | 25 |  | b 300 |  |
| Hydrogen chloride | a 400 |  |  | 50 | 50 |  |
| Water |  | 20 |  | 184 | (c) |  |
| Oxygen | 140 |  |  |  | 40 |  |
| Nitrogen | 526 |  |  |  | 113 |  | a After startup, includes 320 pound moles per hour of hydrogen chloride recycled from distillation of aqueous hydrogen chloride stream recovered from I.
b Includes fresh feed ethylene added during startup of process. After startup, 275 pound moles per hour of ethylene are supplied by recycle.
c Water from I plus added water as needed to maintain heat balance.

As can be seen from the foregoing examples, the present invention provides an economical process for converting ethane to vinyl chloride in high yield with only minimal consumption of available chlorine. Thus, in Example 1, available chlorine makeup is only 42 pound moles per hour of molecular chlorine or 1.08 gram atoms of available chlorine per gram mole of vinyl chloride product. In Example 2, available chlorine makeup is only 80 pound moles per hour of hydrogen chloride or 1.07 gram atoms of available chlorine per gram mole of vinyl chloride product. Further, this invention achieves efficient available chlorine utilization and recovery without the necessity for breaking the water-hydrogen chloride azeotrope.

While the invention has been shown and described and illustrated with reference to certain preferred embodiments thereof, those skilled in the art will appreciate that various modifications, changes and omissions can be made without departing from the spirit of the invention. Therefore it is intended that the invention be limited only by the scope of the claims which follow.

I claim:

1. Process of producing vinyl chloride which comprises oxychlorinating ethane in the vapor phase at about 400 to 700° C. in the presence of an oxychlorination multivalent metal compound catalyst, oxygen and available chlorine in the form of hydrogen chloride or chlorine to produce a vapor phase product containing hydrogen chloride, ethylene, vinyl chloride and water; resolving said vapor phase product to recover at least said vinyl chloride; oxychlorinating said ethylene in an aqueous liquid reaction medium comprising said water and said hydrogen chloride product in the liquid phase at about 100 to 200° C. in the presence of a dissolved oxychlorination multivalent metal chloride catalyst, oxygen and the hydrogen chloride of said vapor phase product; recovering a liquid phase product comprising ethylene dichloride; and recycling said ethylene dichloride to said vapor phase oxychlorination.

2. Process as claimed in claim 1 wherein said vapor phase product is resolved to recover hydrogen chloride and water therefrom.

3. Process as claimed in claim 2 wherein said recovered hydrogen chloride and water are fed to said liquid phase oxychlorination.

4. Process as claimed in claim 2 wherein said recovered hydrogen chloride and water are distilled to recover a nearly anhydrous hydrogen chloride stream and form bottoms of an azeotrope of hydrogen chloride and water and the azeotrope is fed to said liquid phase oxychlorination.

5. Process as claimed in claim 1 wherein said liquid phase oxychlorination catalyst is dissolved cuprous chloride/cupric chloride.

6. Process as claimed in claim 1 wherein fresh feed oxygen is supplied to both said vapor phase and said liquid phase oxychlorinations.

7. Process as claimed in claim 1 wherein the vapor phase oxychlorination product is resolved to recover substantially all chlorinated hydrocarbons therefrom and said chlorinated hydrocarbon fraction is resolved to recover at least vinyl chloride therefrom and to recycle to said vapor phase oxychlorination substantially all other chlorinated hydrocarbons having two carbon atoms therein.

8. Process as claimed in claim 1 wherein said liquid phase oxychlorination is carried out at about 5 to 50% ethylene conversion.

9. Process as claimed in claim 1 wherein said liquid phase oxychlorination product is resolved to separate chlorinated products from ethylene and said ethylene is recycled to said liquid phase oxychlorination.

10. Process of producing vinyl chloride which comprises oxychlorinating ethane in the vapor phase at a temperature of about 400 to 700° C. in the presence of a oxychlorination multivalent metal compound catalyst, oxygen and available chlorine in the form of hydrogen chloride or chlorine to produce a vapor product containing vinyl chloride, ethylene, hydrogen chloride, and water; resolving said vapor product to recover at least the vinyl chloride and a first aqueous hydrogen chloride stream; distilling said first aqueous hydrogen chloride stream to produce overhead of an early anhydrous hydrogen chloride stream and bottoms of a second aqueous hydrogen chloride stream; recycling said nearly anhydrous hydrogen chloride stream as available chlorine to said ethane oxychlorination; oxychlorinating said ethylene in an aqueous reaction medium comprising said second aqueous hydrogen chloride stream in the liquid phase at a temperature of about 100 to 200° C. in the presence of a dissolved oxychlorination multivalent metal chloride catalyst and oxygen; recovering a liquid phase product comprising ethylene dichloride; and recycling said ethylene dichloride to said vapor phase oxychlorination.

11. Process as claimed in claim 10 wherein said second aqueous hydrogen chloride stream is an azeotrope of hydrogen chloride and water.

12. Process of producing vinyl chloride which comprises oxychlorinating ethane in the vapor phase at a temperature of about 400 to 700° C. in the presence of a oxychlorination multivalent metal compound catalyst, oxygen and available chlorine in the form of hydrogen chloride or chlorine to produce a vapor phase product containing hydrogen chloride, ethylene, vinyl chloride, and water; resolving said vapor product to recover at least said vinyl chloride; oxychlorinating said ethylene to ethylene dichloride in an aqueous reaction medium comprising said hydrogen chloride and water product in the liquid phase at a temperature of about 100 to 200° C. in the presence of a dissolved oxychlorination multivalent metal chloride catalyst; recovering a liquid phase product comprising ethylene dichloride; recycling said ethylene dichloride to said vapor phase oxychlorination; and regenerating said dissolved oxychlorination multivalent metal chloride catalyst with oxygen and the hydrogen chloride of said vapor phase product.

References Cited

UNITED STATES PATENTS

| | | | |
|---|---|---|---|
| 2,644,846 | 7/1953 | Johnson et al. | 260—659OXY |
| 2,674,633 | 4/1954 | Retlinger | 260—656 |
| 2,746,844 | 5/1956 | Johnson et al. | 260—659OXY |
| 3,055,955 | 9/1962 | Hodges | 260—662AX |
| 3,214,481 | 10/1965 | Heineman et al. | 260—656X |
| 3,214,482 | 10/1965 | Caropreso et al. | 260—656X |

FOREIGN PATENTS

| | | | |
|---|---|---|---|
| 664,117 | 5/1963 | Canada | 260—659OXY |
| 677,714 | 1/1964 | Canada | 260—659OXY |
| 715,136 | 8/1965 | Canada | 260—659OXY |
| 998,689 | 5/1962 | Great Britain | 260—656 |
| 1,067,597 | 5/1967 | Great Britain | 260—656 |

HOWARD T. MARS, Primary Examiner

U.S. Cl. X.R.

260—659

UNITED STATES PATENT OFFICE
CERTIFICATE OF CORRECTION

Patent No. 3,551,506    Dated December 29, 1970

Inventor(s) Norman J. Weinstein

It is certified that error appears in the above-identified patent and that said Letters Patent are hereby corrected as shown below:

Column 5, line 40, "ar" should read -- a --; line 44, "polychloridinated" should read -- polychlorinated --. Column line 17, "ion" should read -- iron --. Column 8, line 44, "an early" should read -- a nearly --. Column 9, line 7, "Retlinger" should read -- Reitlinger --. Column 10, line 5, "5/1962" should read -- 5/1963 --.

Signed and sealed this 1st day of June 1971.

(SEAL)
Attest:

EDWARD M. FLETCHER, JR.
Attesting Officer

WILLIAM E. SCHUYLER, JR.
Commissioner of Patents